United States Patent
Puranik et al.

(10) Patent No.: US 11,042,356 B2
(45) Date of Patent: Jun. 22, 2021

(54) TOURNAMENT TREE ROLLBACK FOR PAYLOAD WRITE EXCEPTION

(71) Applicant: International Business Machines Corporation, Armonk, NY (US)

(72) Inventors: Aditya Nitin Puranik, Pune (IN); Nidhi Chandak, Bangalore (IN); Martin Recktenwald, Schoenaich (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 210 days.

(21) Appl. No.: 16/288,193

(22) Filed: Feb. 28, 2019

(65) Prior Publication Data
US 2020/0278835 A1    Sep. 3, 2020

(51) Int. Cl.
G06F 16/22 (2019.01)
G06F 7/08 (2006.01)
G06F 11/14 (2006.01)

(52) U.S. Cl.
CPC ............ G06F 7/08 (2013.01); G06F 11/1469 (2013.01); G06F 16/2246 (2019.01); *G06F 2201/84* (2013.01)

(58) Field of Classification Search
CPC .......... G06F 16/2246; G06F 16/24556; G06F 16/24558
USPC ......................................... 707/753, 752, 758
See application file for complete search history.

(56) References Cited

U.S. PATENT DOCUMENTS

| | | | |
|---|---|---|---|
| 5,287,494 A | 2/1994 | Garcia et al. | |
| 6,282,541 B1 * | 8/2001 | Hoa | G06F 16/24556 |
| 6,891,834 B1 * | 5/2005 | Dally | H04L 47/10 |
| | | | 370/395.4 |
| 9,251,218 B2 | 2/2016 | Asaad et al. | |
| 9,405,538 B2 | 8/2016 | Ioffe et al. | |
| 10,706,034 B2 * | 7/2020 | Agarwal | G06F 16/2246 |
| 2008/0039211 A1 * | 2/2008 | Terada | A63F 13/12 |
| | | | 463/43 |
| 2015/0046478 A1 * | 2/2015 | Asaad | G06F 16/2246 |
| | | | 707/753 |
| 2016/0110390 A1 | 4/2016 | Asaad et al. | |
| 2016/0110395 A1 * | 4/2016 | Asaad | G06F 16/24578 |
| | | | 707/752 |
| 2016/0171045 A1 | 6/2016 | Buyuktosunoglu et al. | |
| 2016/0188644 A1 * | 6/2016 | Sukhwani | G06F 7/24 |
| | | | 707/753 |
| 2018/0205672 A1 | 7/2018 | Dong et al. | |

* cited by examiner

*Primary Examiner* — Dangelino N Gortayo
(74) *Attorney, Agent, or Firm* — Cantor Colburn LLP; William Kinnaman

(57) ABSTRACT

Examples of techniques for tournament tree rollback for payload write exception are described herein. An aspect includes receiving a new record for a tournament sort. Another aspect includes determining a winner node of the tournament sort based on a tournament tree and the new record. Another aspect includes, based on determining the winner node of the tournament sort, writing out a payload of the winner node. Another aspect includes, in parallel with writing out the payload of the winner node, updating the tournament tree.

17 Claims, 6 Drawing Sheets

TOURNAMENT TREE ROLLBACK FOR PAYLOAD WRITE EXCEPTION

BACKGROUND

The present techniques relate to computing systems. More specifically, the techniques relate to tournament tree rollback for payload write exception in a computing system.

Computing systems are widely used to process and sort data records stored in a database. A variety of sorting algorithms have been developed to reduce sorting time for improving the processing performance of the computing system. One such sorting algorithm is referred to as tournament sort.

In general, a tournament tree sort is a binary-tree based selection and replacement sort algorithm. Tournament sort algorithms allow sorting of keys associated with respective data records in a continuous streaming fashion. Incoming keys are entered into the leaf nodes of a tournament tree and the keys exit, in sorted order, from the tree's root node. For a set of input records that are initially populated into the leaf nodes, pair-wise comparisons are performed at each tree level until a winning record emerges at the tree root. After the initial round of comparisons and populations, each non-leaf node holds exactly one input key, except the winning key which is sent out of the tree. During a continuous sort, after a winner is removed from the tree, a new input record is inserted at the previous winner's leaf node and is compared (and swapped, if needed) with exactly one non-leaf node at each level, until the tree root is reached and the new winner is determined.

SUMMARY

According to an embodiment described herein, a system can include a processor to receive a new record for a tournament sort. The processor can also determine a winner node of the tournament sort based on a tournament tree and the new record. The processor can also, based on determining the winner node of the tournament sort, write out a payload of the winner node. The processor can also, in parallel with writing out the payload of the winner node, update the tournament tree.

According to another embodiment described herein, a method can include receiving, by a processor, a new record for a tournament sort. The method can also include determining, by the processor, a winner node of the tournament sort based on a tournament tree and the new record. The method can also include, based on determining the winner node of the tournament sort, writing out, by the processor, a payload of the winner node. The method can also include, in parallel with writing out the payload of the winner node, updating, by the processor, the tournament tree.

According to another embodiment described herein, an apparatus can include a computer readable storage medium having program instructions embodied therewith, the program instructions executable by a processing device to cause the processing device to perform a method comprising receiving a new record for a tournament sort. The apparatus can also include can also program code executable by the processing device to determine a winner node of the tournament sort based on a tournament tree and the new record. The apparatus can also include can also program code executable by the processing device to, based on determining the winner node of the tournament sort, write out a payload of the winner node. The apparatus can also include can also program code executable by the processing device to, in parallel with writing out the payload of the winner node, update the tournament tree.

DETAILED DESCRIPTION

Figure 1:
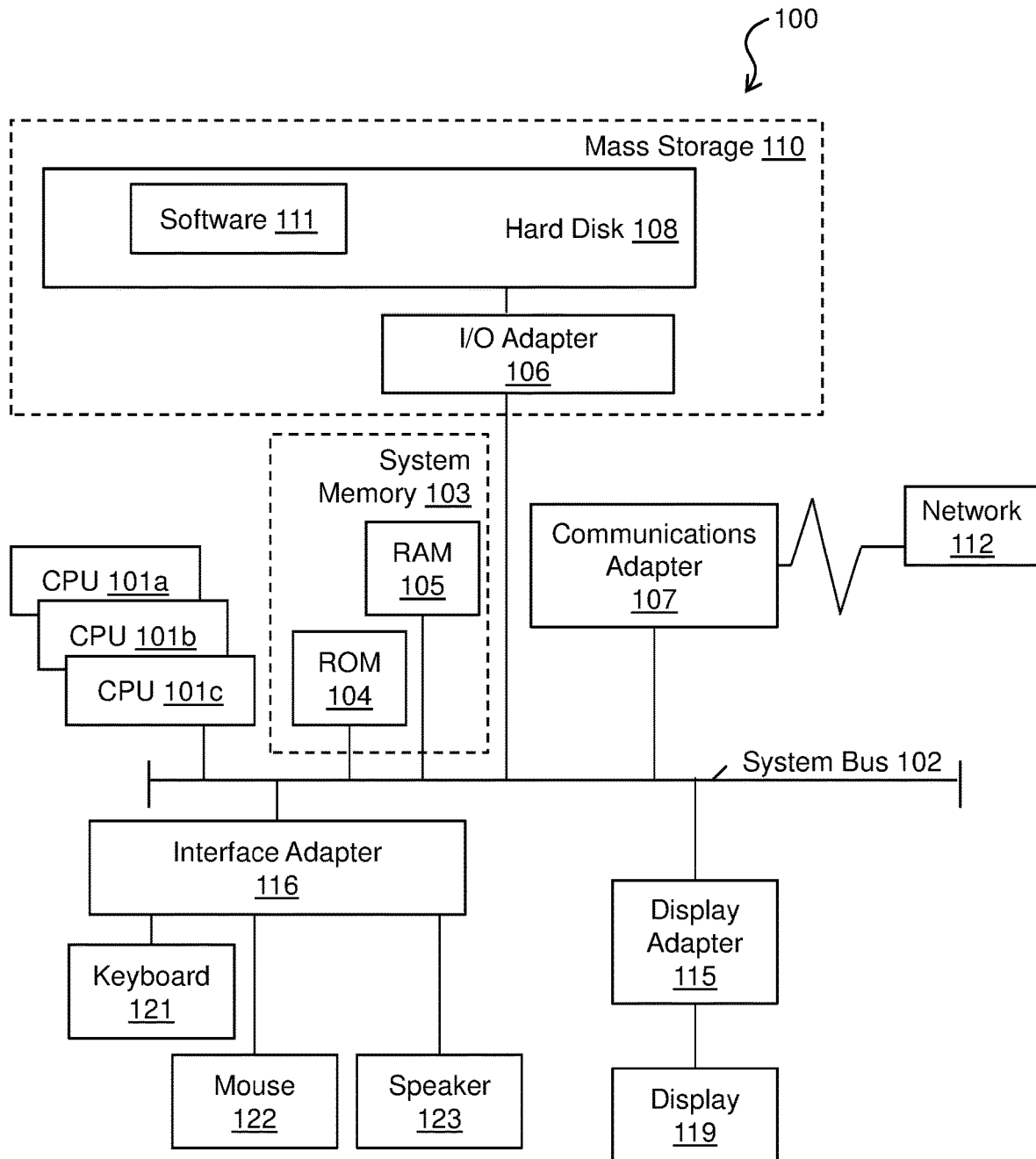
FIG. 1 is a block diagram of an example computing system for use in conjunction with tournament tree rollback for payload write exception.

Embodiments of tournament tree rollback for payload write exception are provided, with exemplary embodiments being discussed below in detail. Each record in a tournament tree includes a respective key and a payload associated with the key. The keys are used for comparisons between records while sorting the nodes of the tournament tree. When the winner key is determined for an iteration of the tournament sort, the payload associated with the winner key in the winner record (or node) is written out to a target memory location. The tournament tree may be updated based on the comparisons in parallel with the writing out of the winner payload in order to reduce an amount of time necessary to perform the tournament trees sort. During the payload write, an exception (including but not limited to an access exception, a data exception, or an amount of space required for the payload write not being available at the target memory location) may occur, so that the payload write is not successfully completed. The payload write exception may trigger a tree rollback in order to allow a correct restart of the tournament sort.

A tournament sort including tournament tree rollback for payload write exceptions may begin when a new record, including a key and an associated payload, is obtained from an input list and stored in a new element latch. An upward traversal of the tournament tree is then performed, starting at a leaf node that held a previous winner of the tournament sort. The new record key may be compared with the keys of the nodes in the tree to determine a winner (e.g., a smallest or largest key) key at each level up the tree. The comparisons may be written into a has_won vector, which indicates, for each level of the tree, whether the record stored in the new element latch won or lost the comparison against the node located in the tree. At the end of the comparisons, the has_won vector may contain a respective one or zero for each level of the tree. Once the top of the tree is reached, the payload associated with the winning key is written out, and the tournament tree may be simultaneously updated based on the has_won vector. In order to update the tournament tree, a traversal up the tree may be performed, and nodes are updated at each level of the tree based on the has_won vector. For example, in some embodiment, if has_won [level] is 1, the node at the current level may be swapped with the element in the new element latch, whereas if has_won[level] is 0, no swap may be performed. The top node of the tree (e.g., level=0) may be updated to point to a next element in a winner list after the payload of the winning record is successfully written out.

If an exception occurs during the writing out of the payload of the winning record, the has_won vector may be used to roll back the tree. While the payload write is attempted, the tree update is completed, except for updating of the top node of the tree (e.g., level 0). If an exception occurs, the tree is traversed from level 1 (i.e., the level one below the top of the tree) downwards to the bottom of the tree. At each level, swaps may be performed based on the has_won vector. For example, in some embodiments, if has_won[level] is 1, the node at the current level is swapped with the element in the new element latch, while if has_won [level] is 0, no swap is performed. Once the bottom of the tree is reached, the tree is reverted. Because the top node (e.g., level 0) was not updated, it does not need to be reverted. Therefore, in some embodiments, updating of the top node in the tree may be performed based on the payload write being successfully completed.

Turning now to FIG. 1, a computer system 100 is generally shown in accordance with an embodiment. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc. (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system, such as the z/OS or AIX operating system from IBM Corporation, to coordinate the functions of the various components shown in FIG. 1.

Additional input/output devices are shown as connected to the system bus 102 via a display adapter 115 and an interface adapter 116 and. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by a display adapter 115, which may include a graphics controller to improve the performance of graphics intensive applications and a video controller. A keyboard 121, a mouse 122, a speaker 123, etc. can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computing system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
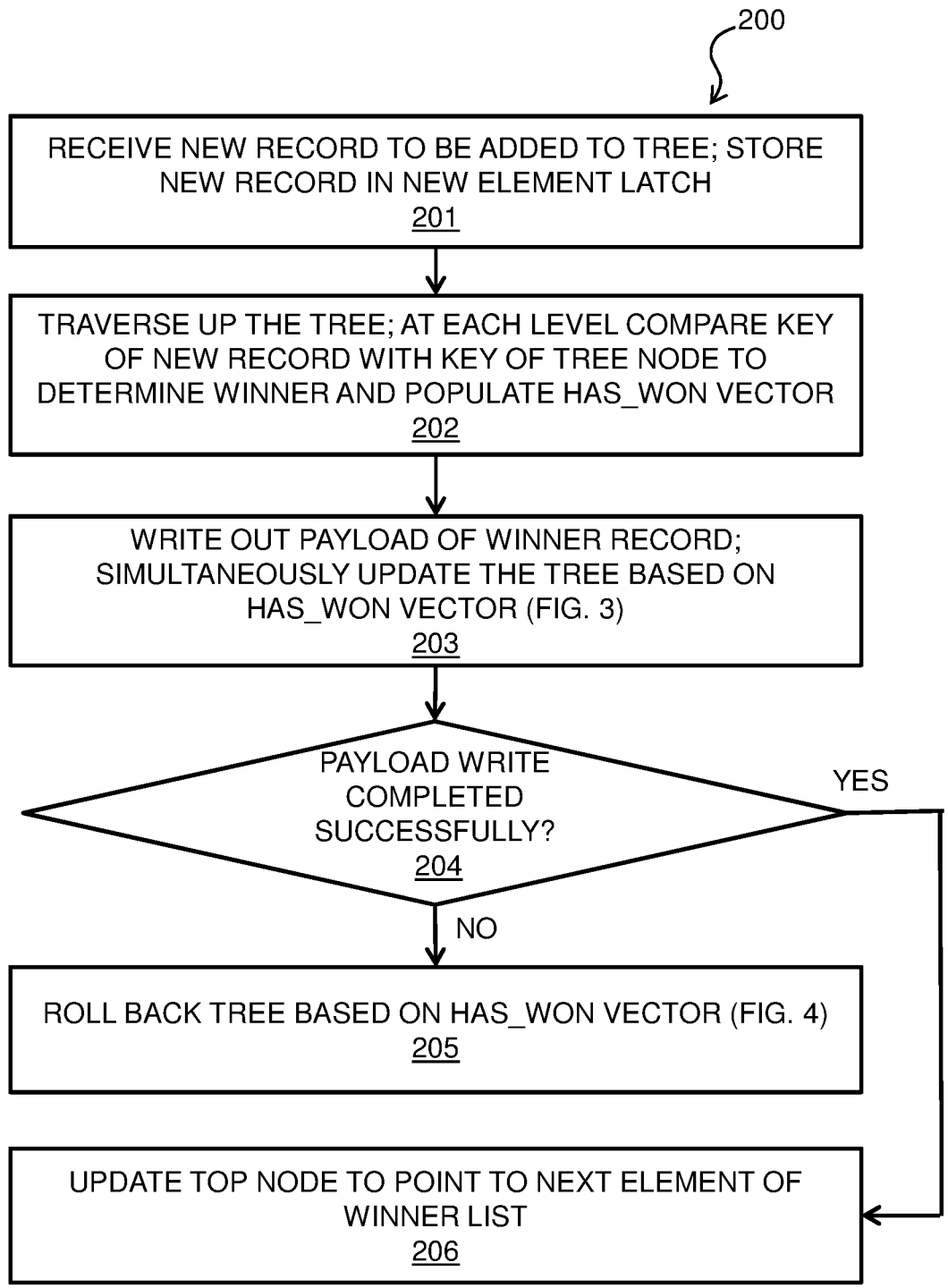
FIG. 2 is a process flow diagram of an example method for tournament tree rollback for payload write exception.

FIG. 2 is a process flow diagram of an example method for tournament tree rollback for payload write exception. The method 200 can be implemented with any suitable computing device, such as the computer system 100 of FIG. 1, and may be performed by, for example, software 111 operating on data that is stored in a memory such as hard disk 108 in some embodiments. In block 201, a new record for a tournament tree, including a key and an associated payload, is received. The new record may be stored in a memory such as a new element latch in some embodiments. In block 202, the tournament tree is traversed. In some embodiments, the tree is traversed upwards, starting at the bottom of the tree at a leaf node that held the winning node of the previous iteration of the tournament sort. At each level of the tree, the key of the record in the new element latch is compared to the key of the node located at the current level of the tree, and a winner is determined based on the comparison (e.g., the smallest or largest of the two keys may be determined to be the winner). An entry in a has_won vector may be updated to reflect each comparison. The has_won vector may be a vector containing a number of entries equal to the number of levels in the tree (e.g., for a tree having N levels, the entries in the has_won vector may be numbered from 0, representing the top of the tree, to N−1, representing the bottom of the tree). Each of the N entries in the has_won vector is a one or a zero, indicating whether the node in the tree won or lost the comparison at the level corresponding to the entry in the has_won vector. When the traversal of block 202 reaches the top of the tree, the has_won vector for the comparisons involving the new record is fully populated, and a new winning record has been determined. Flow then proceeds from block 202 to block 203.

In block 203, the payload associated with the winning record is written out to a target memory location, and the tournament tree is updated based on the has_won vector in parallel with the payload write. The tree update may be performed as described below with respect to method 300 of FIG. 3. The top node of the tournament tree is not updated in block 203. Flow then proceeds to block 204, in which it is determined whether the payload write has successfully completed (i.e., there were no exceptions during the payload data write). Exceptions that may occur during the payload data write include but are not limited to an access exception, a data exception, or an amount of space required for the payload write not being available at the target memory location of the payload write. If there was determined to be an exception during the payload data write in block 204, flow proceeds from block 204 to block 205, in which the tree is reverted based on the has_won vector. Block 205 is discussed in further detail with respect to method 400 of FIG. 4. If it was determined that the payload write was successfully completed, with no exceptions, in block 204, flow proceeds from block 204 to block 206. In block 206, the top node of the tree is updated to point to a next element of the winner list, and method 200 ends. Method 200 may then be repeated for a next new element.

The process flow diagram of FIG. 2 is not intended to indicate that the operations of the method 200 are to be executed in any particular order, or that all of the operations of the method 200 are to be included in every case. Additionally, the method 200 can include any suitable number of additional operations.

Figure 3:
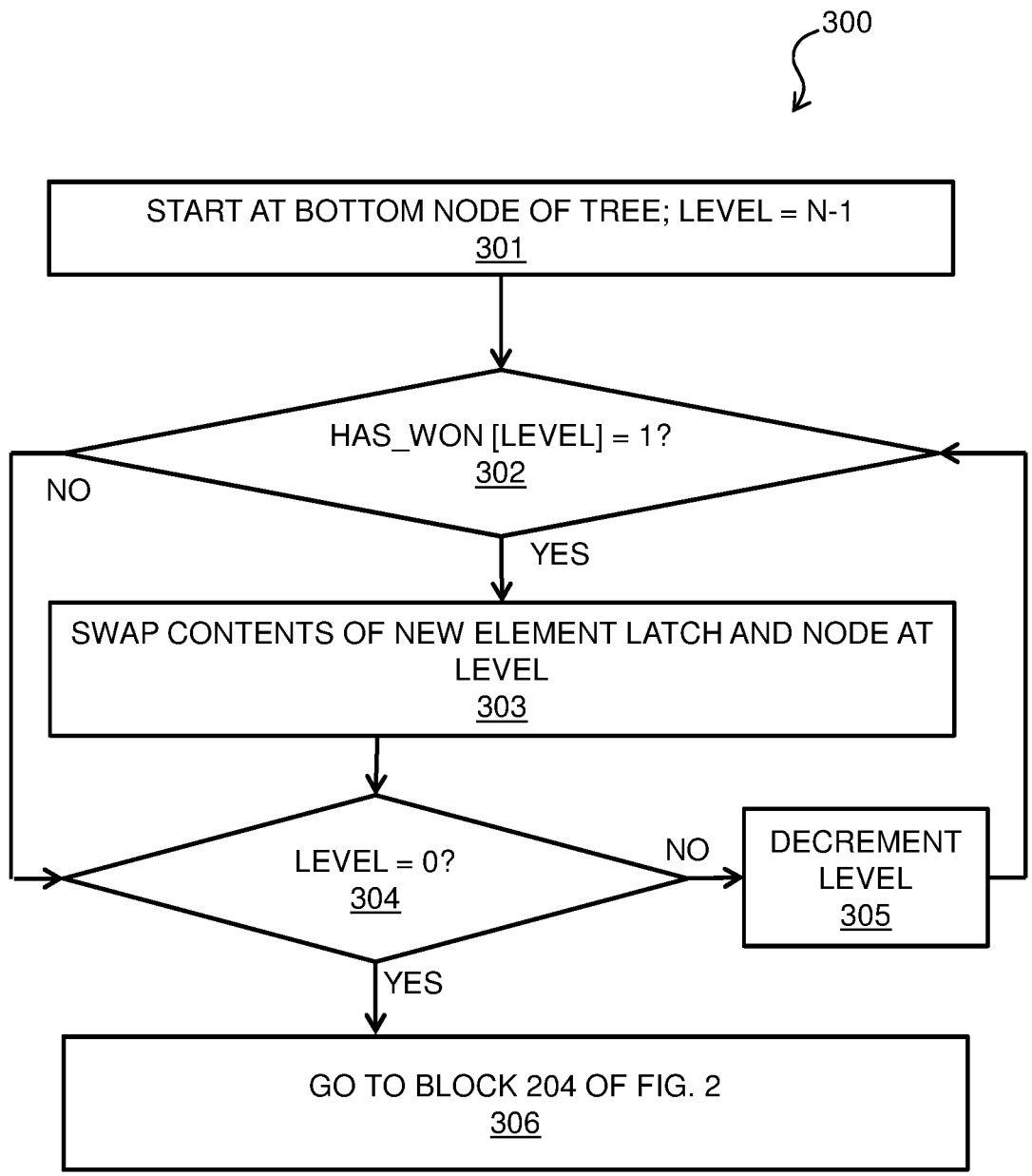
FIG. 3 is a process flow diagram of an example method for updating a tournament tree for tournament tree rollback for payload write exception.

FIG. 3 is a process flow diagram of an example method for updating a tournament tree for tournament tree rollback for payload write exception. The method 300 can be implemented with any suitable computing device, such as the computer system 100 of FIG. 1. Method 300 may be performed in parallel with the payload write in block 203 of FIG. 2. In block 301 of method 300 of FIG. 3, the traversal of the tree starts at the bottom of the tree, e.g., a current level of the tree is set to N−1, where N is the number of levels in the tournament tree, and the levels are numbered from 0 (the top of the tree) to N−1 (the bottom of the tree). In block 302, it is determined whether the entry in the has_won vector corresponding to the current level is equal to 1. If it is determined in block 302 that the entry in the has_won vector corresponding to the current level is equal to 1, flow proceeds from block 302 to block 303, in which the record stored in the new element latch is swapped with the record located at the current level in the tree. Flow then proceeds from block 303 to block 304. If it is determined in block 302 that the entry in the has_won vector corresponding to the current level in the tree is not equal to 1, flow proceeds directly from block 302 to block 304, and no swap is performed. In block 304, it is determined whether the traversal has reached the top of the tree, e.g., whether the current level is equal to zero. If it is determined in block 304 that the top of the tree has not been reached, flow proceeds from block 304 to block 305, and the current level of the tree is decremented. Flow then proceeds from block 305 back to block 302, in which the has_won vector entry for the current level is used to determine whether there should be a swap at the current level according to blocks 302 and 303. Block 302, and optionally block 303, are performed for each level of the tree until it is determined in block 304 that the top of the tree has been reached (e.g., the current level is zero). When the top of the tree is reached in block 304, flow proceeds back to block 204 of FIG. 2. Blocks 302 and 303 are not performed for the top level node of the tree. Method 300 of FIG. 3 may be completed regardless of any exception occurring during the payload data write of block 203 of FIG. 2.

FIG. 3 is shown for illustrative purposes only. For example, a zero or a one in a has_won vector entry may indicate either a win or a loss for either the node in the tree or the record in the new element latch in various embodiments. Further, the levels of a tournament tree may be numbered in any appropriate manner in various embodiments. The process flow diagram of FIG. 3 is not intended to indicate that the operations of the method 300 are to be executed in any particular order, or that all of the operations of the method 300 are to be included in every case. Additionally, the method 300 can include any suitable number of additional operations.

Figure 4:
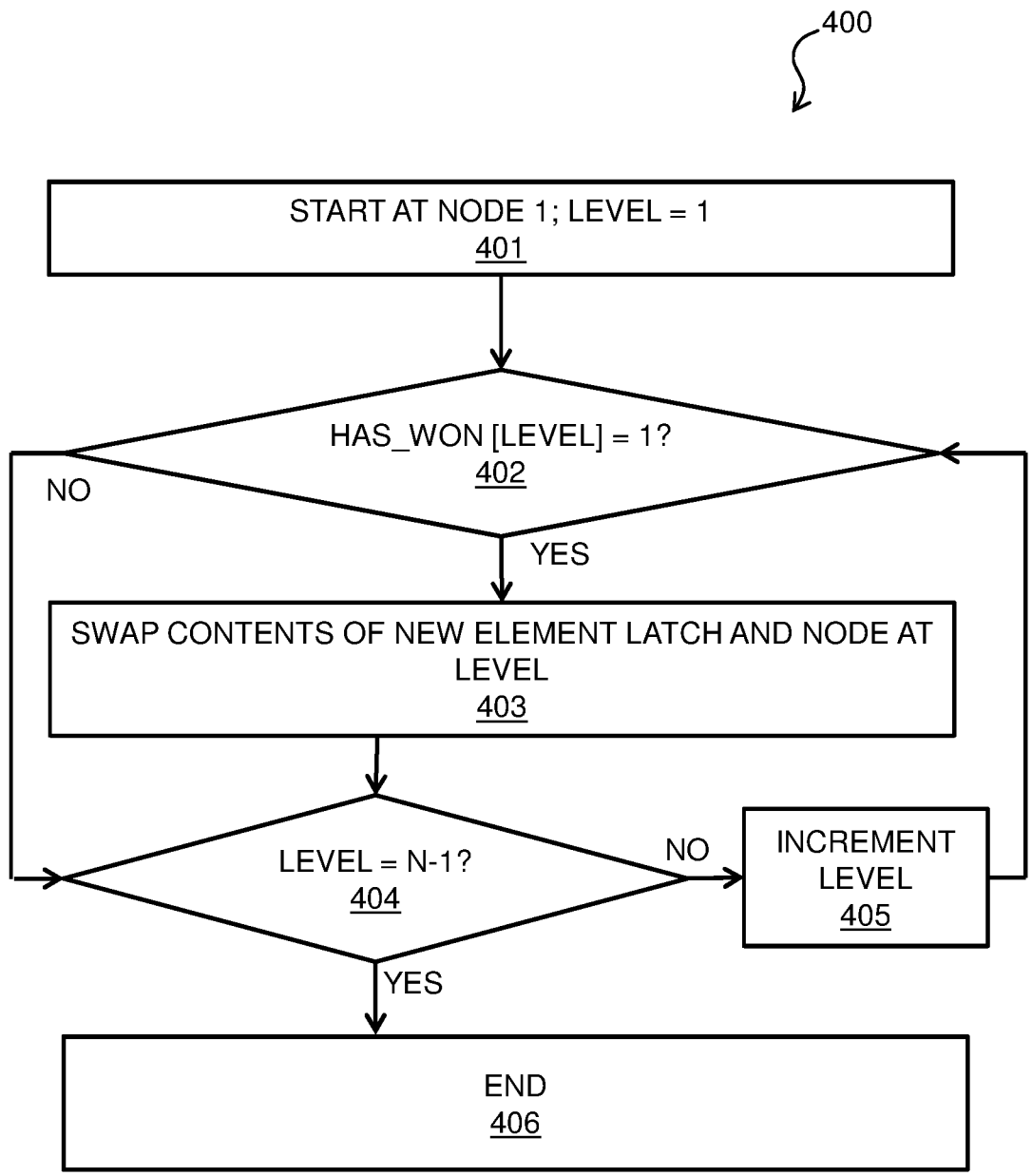
FIG. 4 is a process flow diagram of an example method for rollback of a tournament tree based on a payload write exception.

FIG. 4 is a process flow diagram of an example method for rollback of a tournament tree based on a payload write exception. The method 400 can be implemented with any suitable computing device, such as the computer system 100 of FIG. 1. Method 400 may be performed in block 205 of FIG. 2, based on an exception being determined during the payload data write in block 204 of FIG. 2. In block 401 of method 400 of FIG. 4, a downward traversal of the tree is started at the level one below the top of the tree (e.g., the current level is 1). In block 402, it is determined whether the entry in the has_won vector corresponding to the current level is equal to 1. If it is determined in block 402 that the entry in the has_won vector corresponding to the current level is equal to 1, flow proceeds from block 402 to block 403, in which the record stored in the new element latch is swapped with the record located at the current level in the tree. Flow then proceeds from block 403 to block 404. If it is determined in block 402 that the entry in the has_won vector corresponding to the current level is not equal to 1, flow proceeds directly from block 402 to block 404, and no swap is performed. In block 404, it is determined whether the traversal has reached the bottom of the tree, e.g., whether the current level is equal to N−1. If it is determined in block 404 that the bottom of the tree has not been reached, flow proceeds from block 404 to block 405, and the current level of the tree is incremented. Flow then proceeds from block 405 back to block 402, in which the has_won vector entry for the current level is used to determine whether there should be a swap at the current level according to blocks 402 and 403. Block 402, and optionally block 403, are performed for each level of the tree until it is determined in block 404 that the bottom of the tree has been reached (e.g., the current level is N−1). When the bottom of the tree is reached in block 404, the tree is rolled back, and flow proceeds from block 404 to block 406, in which method 400 ends. Method 200 may then be restarted using the rolled back tournament tree for a next new record.

FIG. 4 is shown for illustrative purposes only. For example, a zero or a one in a has_won vector entry may indicate either a win or a loss for either the node in the tree or the record in the new element latch in various embodiments. Further, the levels of a tournament tree may be numbered in any appropriate manner in various embodiments. The process flow diagram of FIG. 4 is not intended to indicate that the operations of the method 400 are to be executed in any particular order, or that all of the operations of the method 400 are to be included in every case. Additionally, the method 400 can include any suitable number of additional operations.

Figure 5:
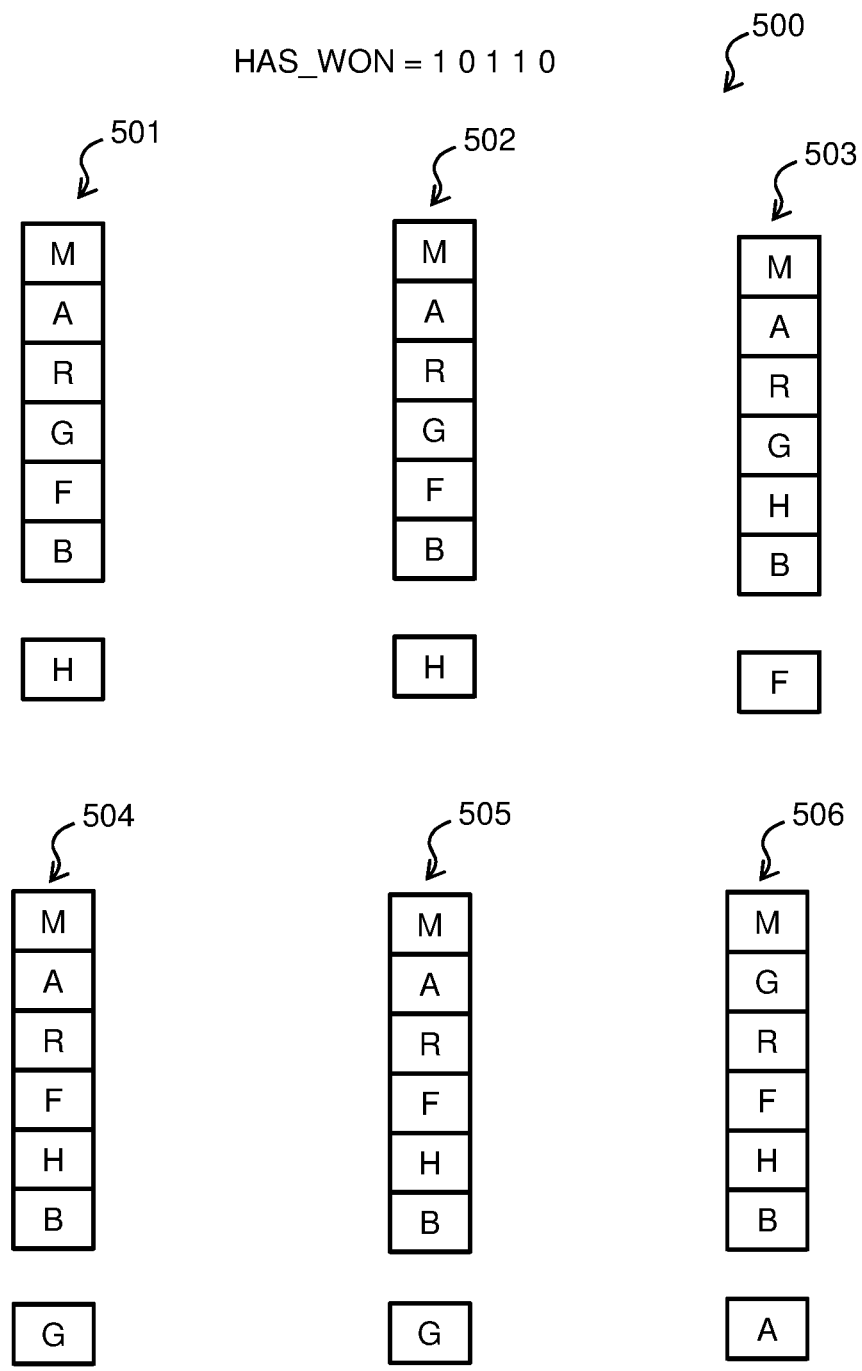
FIG. 5 is a block diagram of an example implementation of an example method for updating a tournament tree for tournament tree rollback for payload write exception.

FIG. 5 is a block diagram 500 illustrating an example of updating of a tree according to method 300 of FIG. 3, as is performed in block 203 of FIG. 2. The example is shown in FIG. 5 is for a 6 level tree (i.e., N=6), and includes a has_won vector comprising 5 entries indexed from 1 to 5 (e.g., [1 0 1 1 0]) that was constructed by the comparisons of the tournament sort in block 202 of FIG. 2. A tournament tree is a binary tree, having 2^N nodes at each level of the tree (e.g., 1 node at level 0, 2 nodes at level 1, etc.). The nodes shown in diagram 500 are the nodes that are in the path of the new elements directly up the tree; other leaf nodes are not shown in FIG. 5. Before the updating of the tree is begun, as shown by the initial tree state 501, the new element latch contains a new record H, and the tree contains record B (leaf node at the bottom of the tree, level 5), record F (level 4), record G (level 3), record R (level 2), record A (level 1), and record M (at the top of the tree, level 0). Each record may include, in some embodiments, a key that is used for comparisons, and an associated data payload.

In the first iteration 502, the current level is set to N−1 in block 301 of FIG. 3, and it is determined in block 302 that has_won[5] is equal to zero, so there is no swap in the first iteration 502. In the second iteration 503, it is determined that has_won[4] is equal to 1 in block 302, so there is a swap according to block 303, i.e., record H is swapped with record F at the fourth level of the tree. In the third iteration 504, it is determined that has_won[3] is equal to 1 in block 302, so there is a swap according to block 303, i.e., record F is swapped with record G at the third level of the tree. In the fourth iteration 505, it is determined that has_won[2] is equal to zero in block 302, so there is no swap in the fourth iteration 505. In the fifth iteration 506, it is determined that has_won[1] is equal to 1 in block 302, so there is a swap according to block 303, i.e., record G is swapped with record A at the second level of the tree. Method 300 is then complete, because record M at the top of the tree is not updated by method 300 of FIG. 3.

The example of FIG. 5 is shown for illustrative purposes only. A tournament tree may include any appropriate number of nodes, and those nodes may include any appropriate data having any appropriate size in various embodiments.

Figure 6:
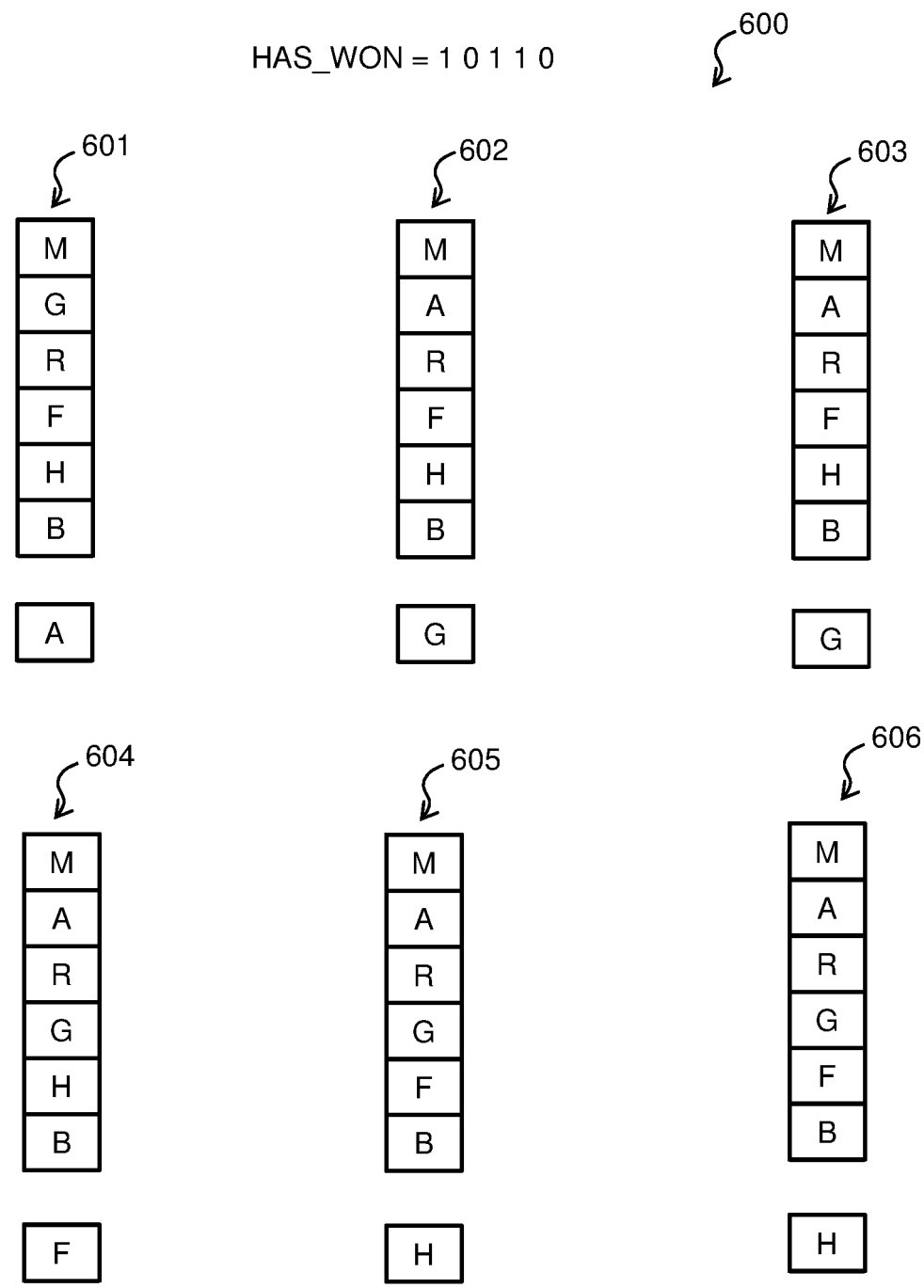
FIG. 6 is a block diagram of an example implementation of an example method for tournament tree rollback based on a payload write exception.

FIG. 6 is a block diagram 600 illustrating an example of rolling back of a tree according to method 400 of FIG. 4. A rollback of a tree, such as is illustrated by diagram 600, is performed based on an exception occurring during the payload write of the winner node (e.g., the payload of node M). The example tree shown in FIG. 6 corresponds to the tree that was updated in FIG. 5, i.e., the initial tree state 601 of the tree of FIG. 6 is the same as the tree after the fifth iteration 506 shown in FIG. 5. The has_won vector also corresponds to the has_won vector shown in FIG. 5. Before the rolling back of the tree is begun, as shown by the initial tree state 601, the new element latch contains record A, and the tree contains record B (at the bottom of the tree, level 5), record H (level 4), record F (level 3), record R (level 2), record G (level 1), and record M (at the top of the tree, level 0). Each record may include, in some embodiments, a key that is used for comparisons, and an associated data payload.

In the first iteration 602, the current level is set to 1 in block 401 of FIG. 4, and it is determined that has_won[1] is equal to 1 in block 402, so there is a swap according to block 403, i.e., record A is swapped with record G at the second level of the tree. In the second iteration 603, it is determined that has_won[2] is equal to zero in block 402, so there is no swap in the second iteration 603. In the third iteration 604, it is determined that has_won[3] is equal to 1 in block 402, so there is a swap according to block 403, i.e., record G is swapped with record F at the third level of the tree. In the fourth iteration 605, it is determined that has_won[4] is equal to 1 in block 402, so there is a swap according to block 403, i.e., record F is swapped with record H at the fourth level of the tree. In the fifth iteration 606, it is determined that has_won[5] is equal to zero in block 402, so there is no swap in the fifth iteration 606. Record M at the top of the tree was not updated by method 300, and does not need to be rolled back. After the fifth iteration 606, the tournament tree matches the initial tree state 501 of FIG. 5. The tournament sort may then be restarted according to method 200 of FIG. 2 using the rolled back tree and a new record.

The example of FIG. 6 is shown for illustrative purposes only. A tournament tree may include any appropriate number of nodes, and those nodes may include any appropriate data having any appropriate size in various embodiments.

The present techniques may be a system, a method or an apparatus. The flowchart and block diagrams in the Figures illustrate the architecture, functionality, and operation of possible implementations of systems, methods, and apparatus according to various embodiments of the present techniques. In this regard, each block in the flowchart or block diagrams may represent a module, segment, or portion of logic for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising a processor configured to:
receive a new record for a tournament sort;
determine a winner node of the tournament sort based on a tournament tree and the new record;
based on determining the winner node of the tournament sort, write out a payload of the winner node;
in parallel with writing out the payload of the winner node, update the tournament tree; and
based on determining an exception during the writing out of the payload of the winner node, roll back the update of the tournament tree.

2. The system of claim 1, wherein a top level node of the tournament tree is updated based on completion of the writing out of the payload of the winner node, wherein completion of the writing out of the payload of the winner node comprises no exception being determined during the writing out of the payload of the winner node.

3. The system of claim 1, wherein the updating of the tournament tree and the rolling back of the update of the tournament tree are performed based on a vector, wherein the vector comprises a plurality of entries, each entry corresponding to a level of the tournament tree.

4. The system of claim 3, wherein the new record is stored in a latch, and wherein updating the tournament tree comprises performing an upward traversal of the tournament tree, and, for each level of the tournament tree:
determining whether an entry in the vector corresponding to the level in the tournament tree indicates a swap; and
based on determining that the entry in the vector corresponding to the level in the tournament tree indicates a swap, swapping contents of the latch with a node located at the level in the tournament tree;
wherein a top level node of the tournament tree is not updated.

5. The system of claim 3, wherein the new record is stored in a latch, and wherein rolling back the tournament tree comprises performing a downward traversal of the tournament tree, and, for each level of the tournament tree:
determining whether an entry in the vector corresponding to the level in the tournament tree indicates a swap; and
based on determining that the entry in the vector corresponding to the level in the tournament tree indicates a swap, swapping contents of the latch with a node located at the level in the tournament tree;
wherein a top level node of the tournament tree is not rolled back.

6. The system of claim 3, wherein the vector is determined by the determining of the winner node of the tournament sort.

7. A computer-implemented method, comprising:
receiving, by a processor, a new record for a tournament sort;
determining, by the processor, a winner node of the tournament sort based on a tournament tree and the new record;
based on determining the winner node of the tournament sort, writing out, by the processor, a payload of the winner node;
in parallel with writing out the payload of the winner node, updating, by the processor, the tournament tree; and
based on determining an exception during the writing out of the payload of the winner node, rolling back the update of the tournament tree.

8. The computer-implemented method of claim 7, wherein a top level node of the tournament tree is updated based on completion of the writing out of the payload of the winner node, wherein completion of the writing out of the payload of the winner node comprises no exception being determined during the writing out of the payload of the winner node.

9. The computer-implemented method of claim 7, wherein the updating of the tournament tree and the rolling back of the update of the tournament tree are performed based on a vector, wherein the vector comprises a plurality of entries, each entry corresponding to a level of the tournament tree.

10. The computer-implemented method of claim 9, wherein the new record is stored in a latch, and wherein updating the tournament tree comprises performing an upward traversal of the tournament tree, and, for each level of the tournament tree:
determining whether an entry in the vector corresponding to the level in the tournament tree indicates a swap; and
based on determining that the entry in the vector corresponding to the level in the tournament tree indicates a swap, swapping contents of the latch with a node located at the level in the tournament tree;
wherein a top level node of the tournament tree is not updated.

11. The computer-implemented method of claim 9, wherein the new record is stored in a latch, and wherein rolling back the tournament tree comprises performing a downward traversal of the tournament tree, and, for each level of the tournament tree:
determining whether an entry in the vector corresponding to the level in the tournament tree indicates a swap; and
based on determining that the entry in the vector corresponding to the level in the tournament tree indicates a swap, swapping contents of the latch with a node located at the level in the tournament tree;
wherein a top level node of the tournament tree is not rolled back.

12. The computer-implemented method of claim 9, wherein the vector is determined by the determining of the winner node of the tournament sort.

13. An apparatus comprising:
a computer readable storage medium having program instructions embodied therewith, the program instructions executable by a processing device to cause the processing device to perform a method comprising:
receiving a new record for a tournament sort;

determining a winner node of the tournament sort based on a tournament tree and the new record;

based on determining the winner node of the tournament sort, writing out a payload of the winner node;

in parallel with writing out the payload of the winner node, updating the tournament tree; and based on determining an exception during the writing out of the payload of the winner node, rolling back the update of the tournament tree.

14. The apparatus of claim 13, wherein a top level node of the tournament tree is updated based on completion of the writing out of the payload of the winner node, wherein completion of the writing out of the payload of the winner node comprises no exception being determined during the writing out of the payload of the winner node.

15. The apparatus of claim 13, wherein the updating of the tournament tree and the rolling back of the update of the tournament tree are performed based on a vector, wherein the vector comprises a plurality of entries, each entry corresponding to a level of the tournament tree.

16. The apparatus of claim 15, wherein the new record is stored in a latch, and wherein updating the tournament tree comprises performing an upward traversal of the tournament tree, and, for each level of the tournament tree:

determining whether an entry in the vector corresponding to the level in the tournament tree indicates a swap; and based on determining that the entry in the vector corresponding to the level in the tournament tree indicates a swap, swapping contents of the latch with a node located at the level in the tournament tree;

wherein a top level node of the tournament tree is not updated.

17. The apparatus of claim 15, wherein the new record is stored in a latch, and wherein rolling back the tournament tree comprises performing a downward traversal of the tournament tree, and, for each level of the tournament tree:

determining whether an entry in the vector corresponding to the level in the tournament tree indicates a swap; and based on determining that the entry in the vector corresponding to the level in the tournament tree indicates a swap, swapping contents of the latch with a node located at the level in the tournament tree;

wherein a top level node of the tournament tree is not rolled back.

\* \* \* \* \*